US012212889B2

(12) United States Patent
Roper

(10) Patent No.: US 12,212,889 B2
(45) Date of Patent: Jan. 28, 2025

(54) DYNAMIC CONTEXT-SENSITIVE VIRTUAL BACKGROUNDS FOR VIDEO CONFERENCES

(71) Applicant: Zoom Video Communications, Inc., San Jose, CA (US)

(72) Inventor: Brandon Roper, Washington, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/508,683

(22) Filed: Oct. 22, 2021

(65) Prior Publication Data

US 2023/0126108 A1 Apr. 27, 2023

(51) Int. Cl.
*H04N 7/15* (2006.01)
*H04N 5/272* (2006.01)
*H04N 7/14* (2006.01)

(52) U.S. Cl.
CPC .............. *H04N 7/15* (2013.01); *H04N 5/272* (2013.01); *H04N 7/147* (2013.01); *H04N 7/152* (2013.01); *H04N 7/157* (2013.01)

(58) Field of Classification Search
None
See application file for complete search history.

(56) References Cited

U.S. PATENT DOCUMENTS

| | | | | |
|---|---|---|---|---|
| 11,233,974 | B1* | 1/2022 | Adcock | G06F 3/167 |
| 2012/0050323 | A1* | 3/2012 | Baron, Jr. | G09G 5/14 |
| | | | | 345/632 |
| 2013/0265382 | A1* | 10/2013 | Guleryuz | H04N 7/15 |
| | | | | 348/14.08 |
| 2022/0239847 | A1* | 7/2022 | Swierk | G06N 3/084 |
| 2022/0353473 | A1* | 11/2022 | Springer | H04N 5/272 |

FOREIGN PATENT DOCUMENTS

CN 107610078 A * 1/2018

* cited by examiner

*Primary Examiner* — Quoc D Tran
(74) *Attorney, Agent, or Firm* — Kilpatrick Townsend & Stockton LLP

(57) ABSTRACT

One example device for dynamic context-sensitive virtual backgrounds for video conferences includes a communications interface; a non-transitory computer-readable medium; and one or more processors configured to execute processor-executable instructions stored in the non-transitory computer-readable medium to join a video conference hosted by a video conference provider; select a virtual background from a plurality of virtual backgrounds based on a characteristic of the virtual background and at least one of a characteristic of the video conference or a characteristic of a user of the client device; receive, from a camera, a video stream, the video stream including video images of the user; generate a video feed comprising the video images of the user superimposed over the selected virtual background; and provide the video feed to the video conference provider.

20 Claims, 7 Drawing Sheets

DYNAMIC CONTEXT-SENSITIVE VIRTUAL BACKGROUNDS FOR VIDEO CONFERENCES

FIELD

The present application generally relates to video conferencing and more particularly relates to dynamic context-sensitive virtual backgrounds for videoconferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
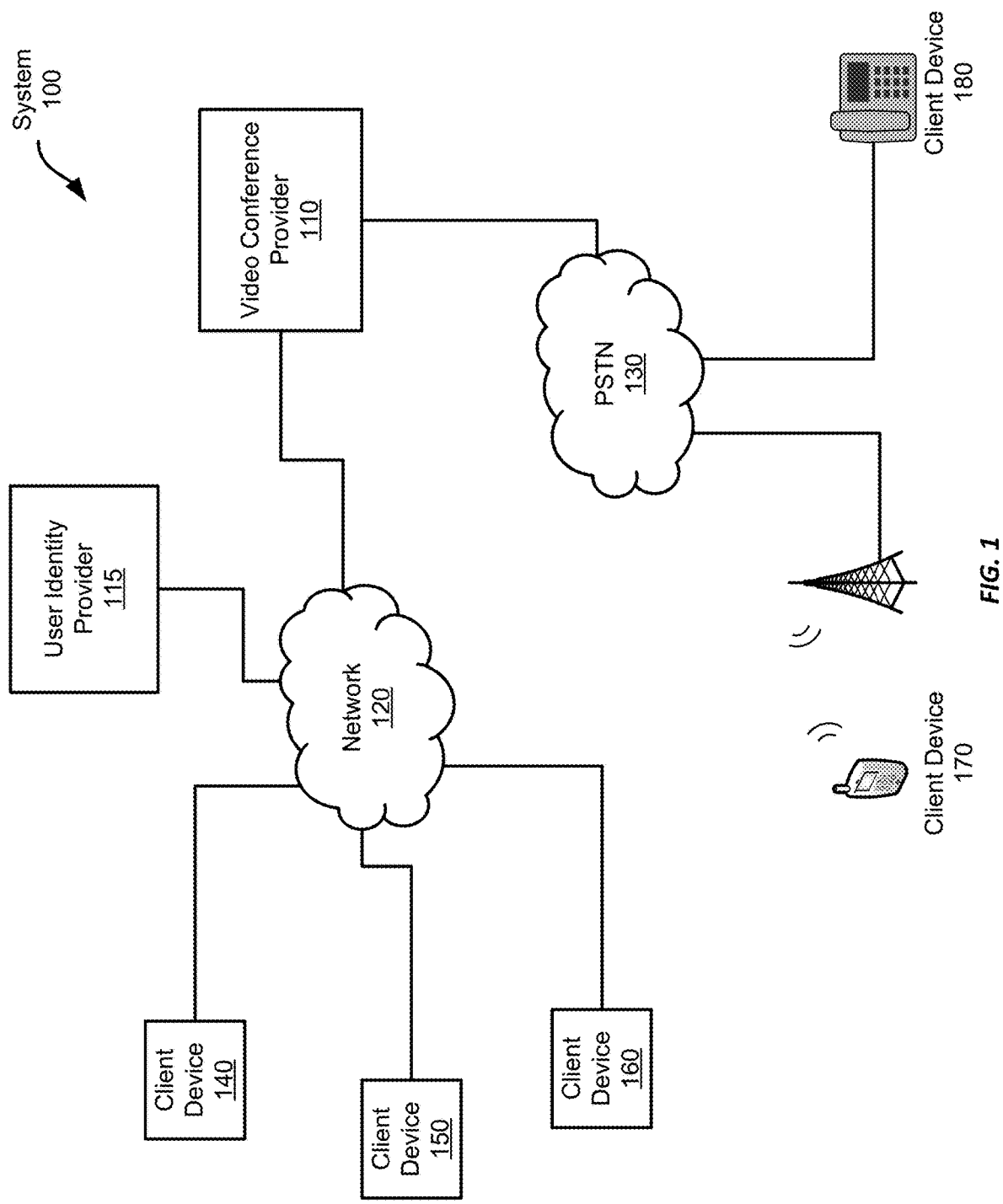
FIGS. 1-2 show example systems for dynamic context-sensitive virtual backgrounds for video conferences.

Examples are described herein in the context of dynamic context-sensitive virtual backgrounds for videoconferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During video conferences, participants use client software provided by their video conference provider to share data streams of video and audio (collectively "multimedia streams") to interact with each other. The use of video helps the participants more fully engage with each other and provides a more immersive virtual experience. One side effect of video conferences, however, is that each person's video stream captures both the participant and their surroundings, which the participant may not wish to share for any number of reasons. To avoid sharing information about their physical surroundings, a participant may select one or more options in their client software to affect the display of their surroundings. For example, a participant may select an option to blur portions of the video feed that are not the participant's face or body, or they may select a different option to use an image or video as their background instead of their true surroundings.

However, the process of selecting a background can be burdensome on the participants. First, the process of navigating the client software's graphical user interface ("GUI") can be cumbersome or slow, if the participant is not familiar with the process. Thus, the participant may avoid changing their background, once selected, because they do not want to undertake the process again. In addition, to select a background, the participant must have one or more suitable backgrounds to select from. This can involve finding and accessing a pool of available images or videos and then reviewing each one until a suitable one is identified, or the participant becomes overwhelmed and selects an image at random.

In some cases, the participant may use their own photos, graphics, animations, or videos as a background, but in others, they may access backgrounds offered by the video conference provider or a third party content provider. During the process of selecting a background, the participant may inadvertently select the same background as others attending the same video conference, a background that is distracting to others in the video conference, or a background that clashes with the participant's clothing, hair color, lighting or other features.

To alleviate the burden on the participant to select backgrounds and also to select backgrounds that suit an upcoming video conference, an example video conference software client (or "video conferencing application") may obtain characteristics of the participant, such as from captured images of the user or from profile information about the user. It may do so while the user is waiting to be admitted to a video conference or after the user has already joined the video conference. The software client may also obtain characteristics of the video conference, such as whether it is a business or professional video conference or a casual or family call, the time of day, the time of year, etc. It may also obtain information about one or more available backgrounds, such as color content, type or nature of animations, subject matter, whether others in the video conference are already using it, etc.

After obtaining some or all of this information, the software client may select a suitable background from the available backgrounds and configure the user's software client to use the selected background. Once the background has been set, the video conference client may then join the user to the meeting or enable the user's video stream.

A video conference client with such functionality can improve the user experience by customizing the look and feel of the user's video stream with minimal, or even no, interaction required by the user. By employing various contextual cues to select a suitable background, the video conference client may also improve the user experience by providing new, fresh backgrounds that visually complement the user, are suitable for the type of meeting, and may reflect other contextual information, such as the time of day, season, etc.

This illustrative example is given to introduce the reader to the general subject matter discussed herein and the disclosure is not limited to this example. The following sections describe various additional non-limiting examples and examples of dynamic context-sensitive virtual backgrounds for videoconferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
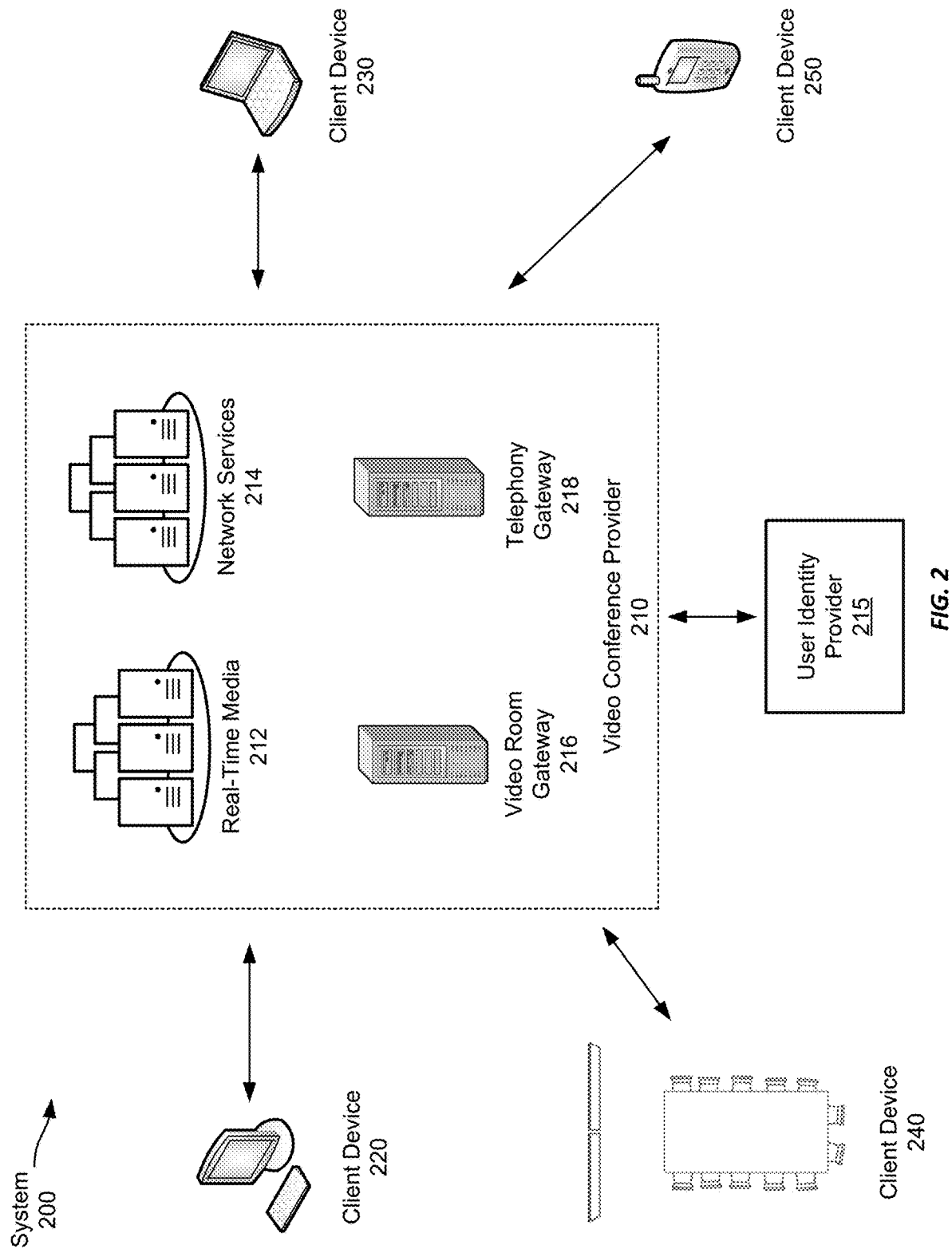

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
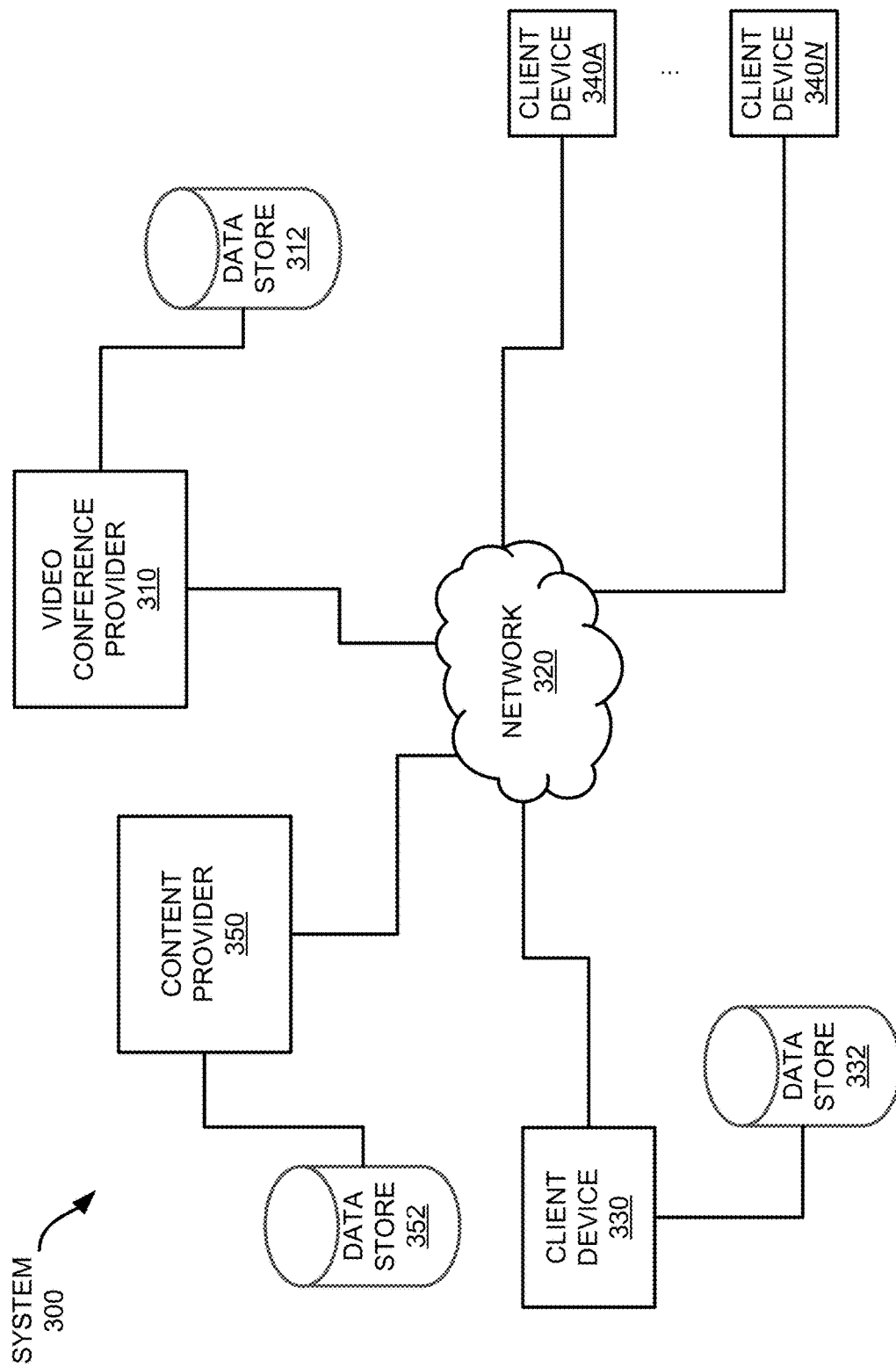
FIGS. 3A-3B show an example system and client device for dynamic context-sensitive virtual backgrounds for video conferences.
Figure 3B:
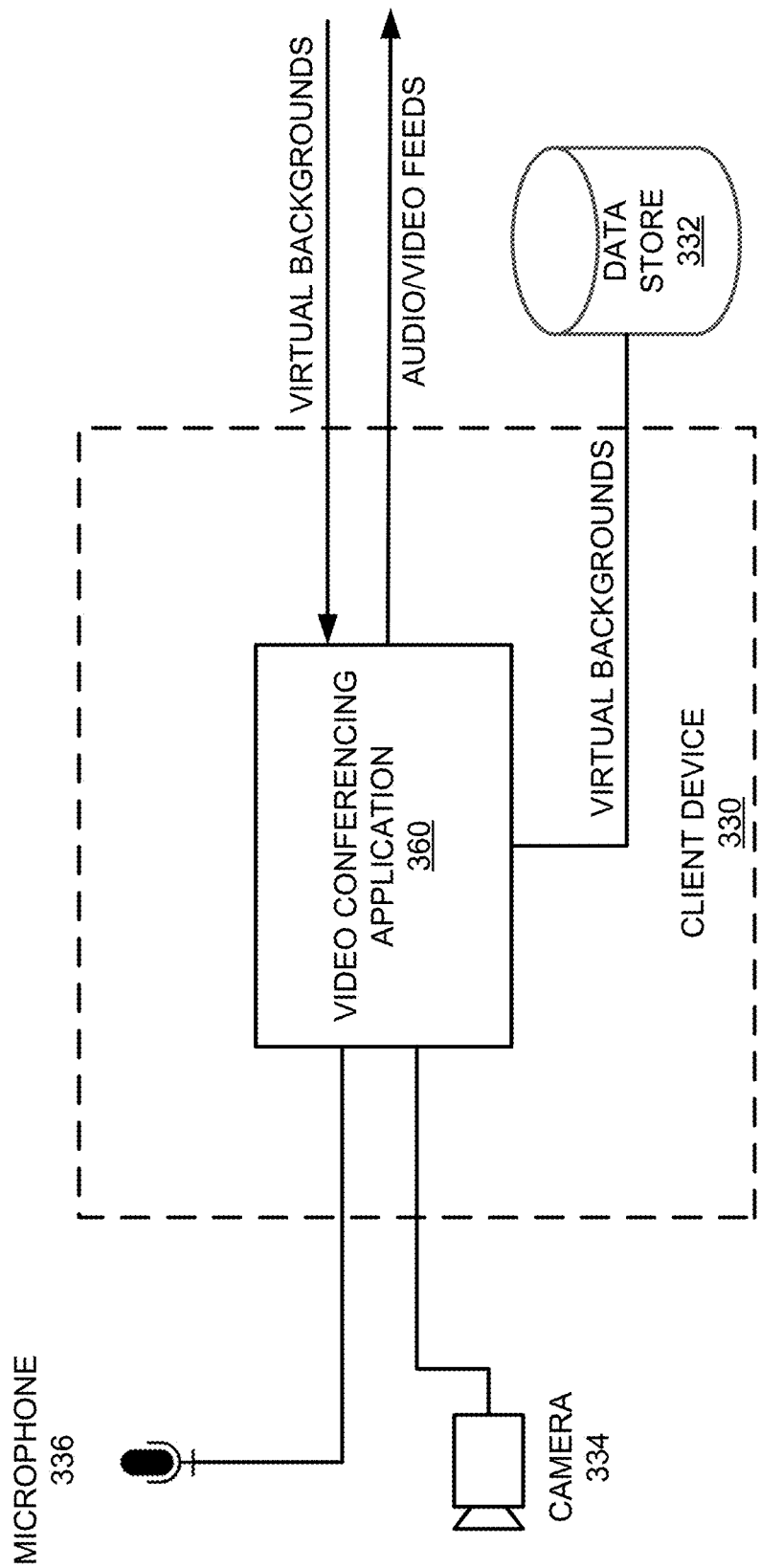

Referring now to FIGS. 3A-3B, FIG. 3A shows an example system 300 for dynamic context-sensitive virtual backgrounds for video conferences. The system 300 includes a video conference provider 310, multiple client device 330, 340a-n, and a content provider 350, which are connected to network 320, which may include one or more different public or private networks, such as the internet. The client devices 330, 340a-n in this example are connected to the video conference provider 310 and are participating in a video conference. The user of client device 330 executes a video conferencing application 360, shown in FIG. 3B, which connects to the video conference provider 310 to join the video conference. As a part of connecting to the video conference, the video conferencing application 360 activates the client device's camera 334 and microphone 336 to capture video and audio streams. The video conferencing application 360 also automatically selects a virtual background to use in the user's video stream.

To automatically select the virtual background, the video conferencing application 360 can analyze one or more characteristics of the user, the video stream from the camera 334, the video conference itself, or of one or more of the available candidate virtual backgrounds. The client device 330 itself has a number of virtual backgrounds stored locally in its data store 332; however, it also has access to virtual backgrounds available from the video conference provider 310 (stored in its data store 312) and the content provider 350 (stored in its data store 352). In this example, the video conferencing application analyzes incoming video frames from the camera 334 to identify pixels corresponding to the user, such as the user's face, the user's torso and arms, the user's hair, etc.

To identify these pixels, the video conferencing application 360 may employ one or more ML models trained to recognize human faces and bodies, which then identify a region in each video frame corresponding to the user. The video conferencing application 360 then identifies pixels within the region corresponding to the different portions of the user, which may further be identified by the same trained ML model or a different ML model. Pixel colors for different features may be extracted and used to establish average colors or shades for each identified feature, such as skin tone, eye color, hair color and length, shirt colors or patterns, etc. These color characteristics may then be stored temporarily and used to match against corresponding characteristics of one or more virtual backgrounds.

In this example, the video conferencing application 360 has preprocessed a folder in the data store 332 containing a number of virtual backgrounds to determine various characteristics of the virtual backgrounds and stored the information as metadata associated with the respective virtual background. The metadata may be appended to a data file that includes the virtual background, it may be stored in a companion file to the virtual background, or as a record in a database associated with the virtual background. The video conferencing application 360 may then access the metadata to identify virtual backgrounds having one or more characteristics suitable for use with the video conference. Any suitable characteristics may be determined, such as average color for the virtual background, dominant colors within the virtual background, a brightness (or darkness) of the virtual background, a time of day represented in the virtual background, animations present in the virtual background, etc. It may also maintain information indicating the last time each virtual background was selected, how many times each virtual background has been selected, any user preference information associated with each virtual background, whether the virtual background corresponds to a business or casual setting, etc.

Similarly, virtual backgrounds available from the content provider 350 or the video conference provider 310 may also have associated characteristics. The characteristics may be determined by the content provider 350 or video conference provider 310, respectively, or the video conferencing application 360 may access the available virtual backgrounds and perform its own processing of one or more of them.

While virtual backgrounds in this example have been pre-processed, in some examples, characteristics of one or more virtual backgrounds may be determined in real-time as the user is preparing to join the meeting, e.g., after the user has selected a "join meeting" option or shortly before a scheduled meeting time (e.g., 5-10 minutes in advance of the scheduled meeting time). Characteristics of the one or more virtual backgrounds may then be used by the video conferencing application as discussed herein.

The video conferencing application 360, after obtaining the characteristic information for the user and one or more virtual backgrounds, attempts to match the user's characteristic information with characteristic information associated with the various virtual backgrounds. For example, the video conferencing application 360 may determine similarities between the user's skin tone and one or more dominant colors in a virtual background, between the user's clothing color or pattern and colors or brightness of various virtual backgrounds, etc. Similarities may be determined based on differences in pixel colors, e.g., based on calculated differences between color channels (e.g., red, green, and blue) in the user's characteristics and the corresponding color channels in the virtual backgrounds. A similarity may be based on the relative differences between the various color channels, with smaller differences indicating a greater similarity. In some examples, colors may be characterized according to a color map or palette and similarities may be determined based on the user's colors mapping to the same or similar colors as those found in a virtual background. In another example, colors mapped to a color palette may be associated with complementary color mappings, e.g., neutral colors (browns, greys, etc.) versus cooler colors (blues, greens, etc.) versus warmer colors (reds, yellows, etc.). Thus, a degree of similarity may encompass whether the respective colors complement each other or not, based on the determined complementary color mappings. Using some or all of these techniques, one or more virtual backgrounds may be identified as candidate backgrounds.

In addition to colors, the video conferencing application 360 may also determine information about the type of video conference. To determine the type of video conference, the video conferencing application 360 may access meeting information associated with the video conference, such as by accessing the user's calendar application, obtaining information from the video conference provider 310, determining a day and time of the video conference, etc. Information obtained from the user's calendar may include the user's email address associated with a meeting corresponding to the video conference, the identities or contact information associated with one or more other attendees of the meeting, the day of the week, the time of day, a subject line for the meeting, an agenda for the meeting, etc.

Once the information from the user's calendar has been obtained, the video conferencing application 360 may determine a likelihood that the meeting is a business or casual meeting, an internal meeting, a client meeting, etc. For example, if the user's email address associated with the meeting is associated with the user's employer or a company rather than a consumer email provider, the video conferencing application may increase a likelihood that the video conference is a business meeting. If the day of the week is a weekday, or the time of day is during normal working hours (e.g., 9 am to 5 pm), the video conference may further increase the likelihood that the meeting is a business meeting.

It may also access email addresses associated with other invitees to the meeting to determine if they are associated with the same email provider, whether via an employer or a consumer email provider. If they are all from the same email provider, which happens to be associated with the user's employer, the video conferencing application 360 may increase the likelihood that the video conference is for a business meeting and that it is an internal meeting. Or if one or more email addresses correspond to contacts in the user's contact application, the contact information may indicate whether the corresponding person works for a client, the same employer, a vendor, etc. Similarly, characteristics of a casual meeting may be that the participants email addresses are associated with one or more consumer email providers, the meeting is scheduled for a weekend, holiday, or after business hours, the subject line of the meeting relates to a leisure activity (e.g., weekend trip, fantasy draft), etc. Thus, the various characteristics can affect the likelihood the meeting is a business meeting or casual meeting.

After determining a type of meeting associated with the video conference, the video conferencing application 360 may identify one or more virtual backgrounds having a corresponding characteristic. For example, if the meeting is determined to be a business meeting, only virtual backgrounds having a "business meeting", "corporate," or "neutral" characteristic may be selected. Alternatively, if the meeting is determined to be a casual meeting, virtual backgrounds having a "casual," "vacation," etc. characteristic may be selected. Further, virtual backgrounds may be further identified based on a correspondence with a subject of the meeting. For example, if the meeting is to discuss an upcoming vacation to the beach, the video conferencing application 360 may identify "beach" as a keyword in the subject of the meeting and identify one or more virtual backgrounds having a "beach" characteristic.

As discussed above, virtual backgrounds may be obtained from any number of sources, including locally stored virtual backgrounds or those obtained from remote devices, such as the content provider 350 or video conference provider 310. In some examples, virtual backgrounds may be obtained from other participants in the video conference. For example, a user may opt to share their virtual backgrounds with other participants in a meeting. This may also involve sharing preprocessed characteristics of those shared virtual backgrounds. The user's video conferencing application 360 may then include the shared virtual backgrounds within the pool of available virtual backgrounds.

Figure 4:
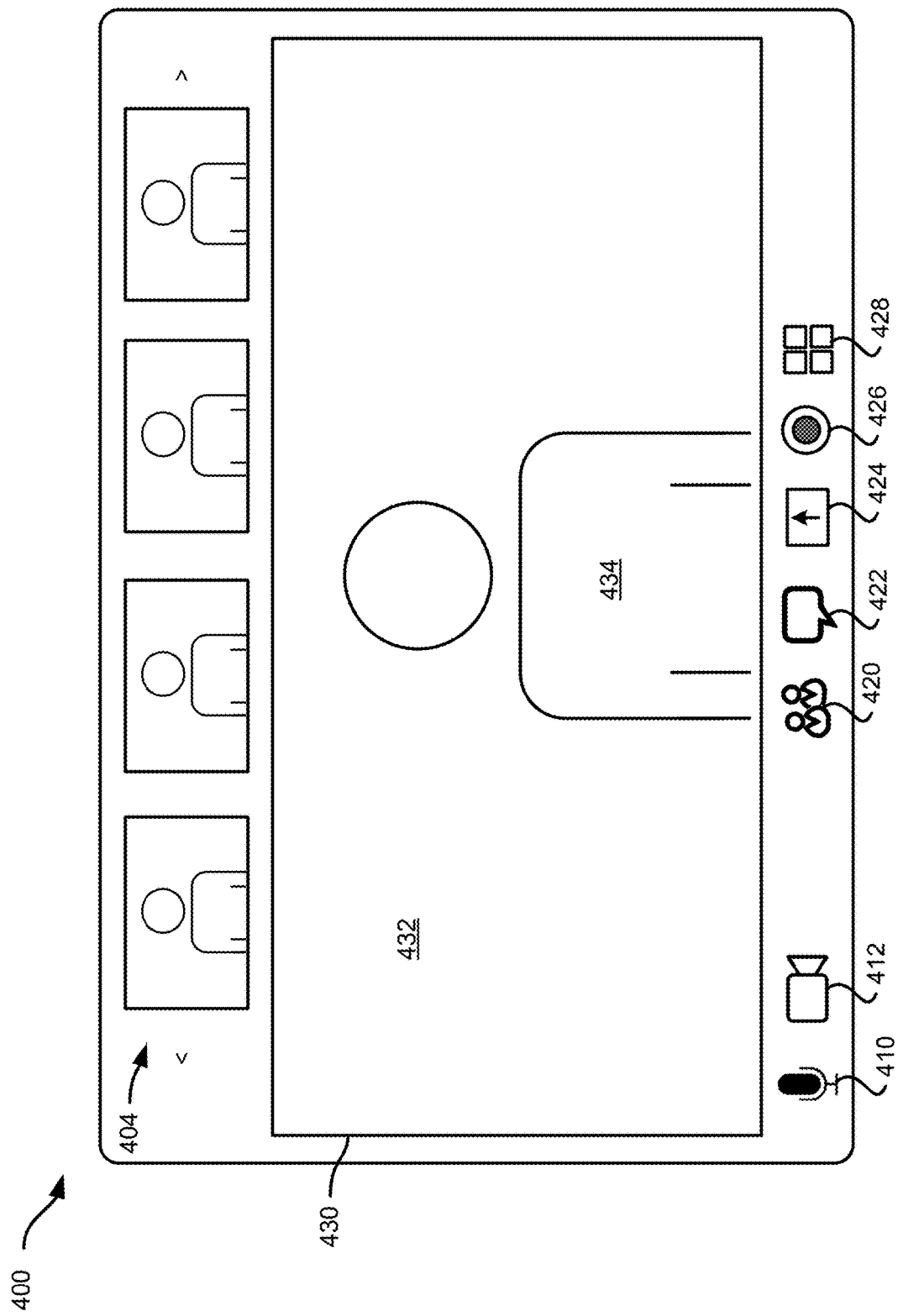
FIG. 4 shows an example graphical user interface ("GUI") for dynamic context-sensitive virtual backgrounds for video conferences.

Referring now to FIG. 4, FIG. 4 shows an example default GUI 400 presented to participants in a video conference. A client device, e.g., client device 330 or client devices 340*a*-*n*, executes a video conferencing application 360, which in turn displays the GUI 400 on the client device's display. In this example, the GUI 400 includes a speaker view window 430 that presents the current speaker 434 in the video conference. Above the speaker view window 430 are smaller participant windows 404, which allow the user to view some of the other participants in the video conference, as well as controls ("<" and ">") to let the host scroll to view other participants in the video conference.

Beneath the speaker view window 430 are a number of interactive elements 410-428 to allow the participant to interact with the video conferencing application. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room.

Referring to the speaker view window 430, in this example, it provides a view of the user 434 of client device 330, as captured by the camera 334, and a background 432. If a virtual background is not used, the background 432 may be whatever is captured within the field of view of the camera 334. However, if the user elects to use a virtual background, the virtual background may be merged with video frames captured by the camera 334 to generate a composite video frame, with the captured image of the user 434 superimposed over the virtual background. Thus, the background 432 will be the virtual background instead of the remaining field of view of the camera. And while this example illustrates the image of the user 434 and the background 432 within the speaker view window, it should be appreciated that the video feed output by the video conferencing application 360 may be presented in any suitable fashion within the GUI, including within one of the small participant windows 404. In addition, the video feed is provided to video conference provider 310 to provide to the other participants, which may view the user and the virtual background in another portion of the GUI 400 displayed at their client device, such as within one of the small participant windows 404. Thus, the GUI 400 enables the user to view their own video feed with the selected virtual background, and other participants in the video conference will receive the user's video feed and be able to view it in the GUI provided by their own respective client devices.

Figure 5:
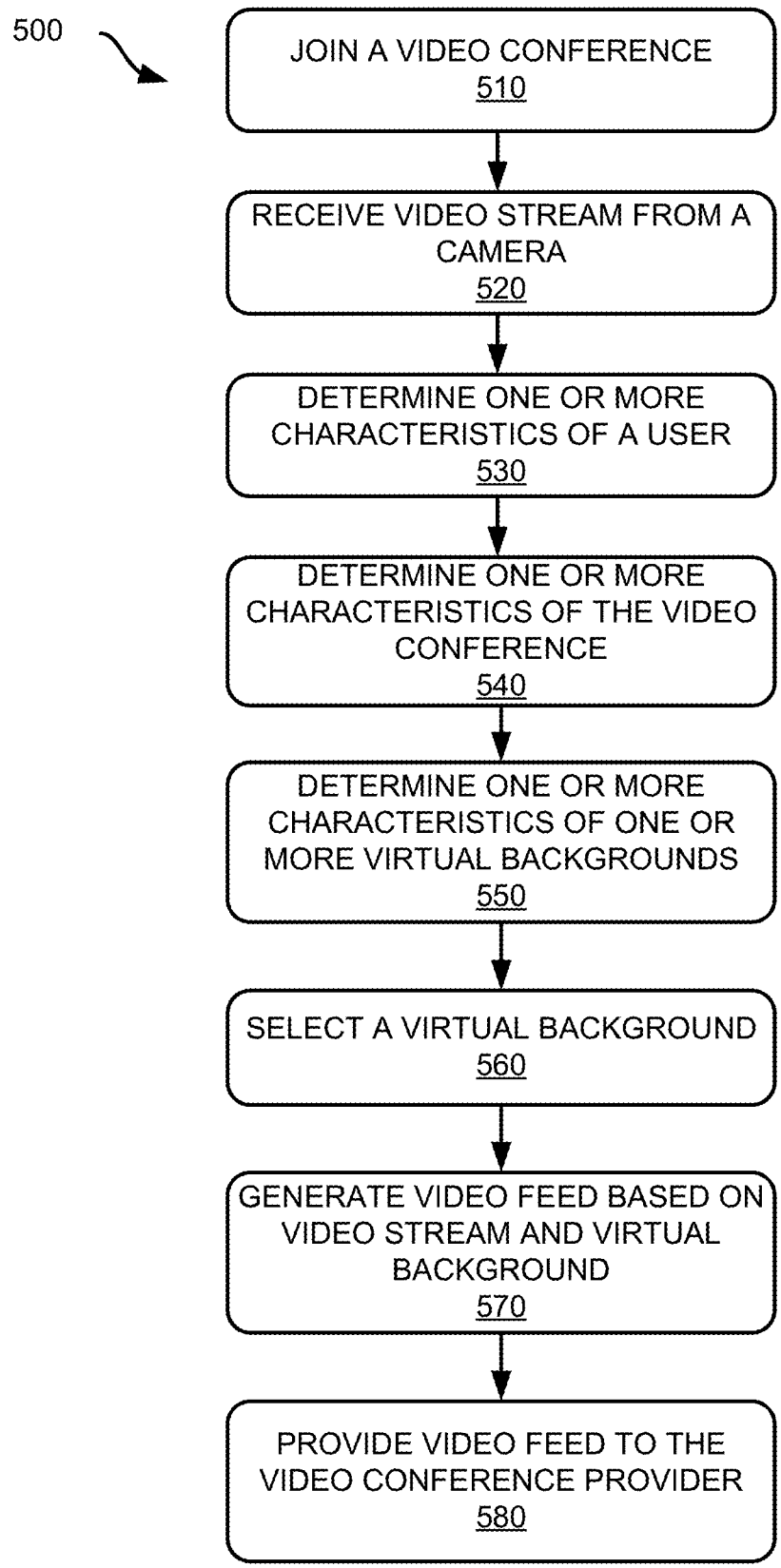
FIG. 5 shows an example method for dynamic context-sensitive virtual backgrounds for video conferences.

Referring to FIG. 5, FIG. 5 shows an example method for dynamic context-sensitive virtual backgrounds for video conferences. The example method 500 will be discussed with respect to the example system 300 shown in FIGS. 3A-3B and the GUI 400 shown in FIG. 4; however, any suitable system or GUI may be employed according to various examples.

At block 510, the user uses the video conferencing application 360 executed by their client device 330 to join a video conference hosted by a video conference provider 310, generally as discussed above with respect to FIGS. 1-2.

At block 520, the video conferencing application 360 receives a video stream from a camera 334.

At block 530, the video conferencing application 360 determines one or more characteristics of a user, such as those discussed above with respect to FIGS. 3A-3B. Characteristics of the user may include visual characteristics, such as hair color, eye color, skin tone, clothing, jewelry, etc., which may be determined based on video frames captured by the camera 334. In some examples, characteristics may include information obtained from a user account or user profile maintained by the video conference provider 310, which may include an age, a gender, a job title or type, an employer or organization, a hobby or interest, etc.

Visual characteristics may be determined based on analyzing pixels in the video stream associated with the user. For example, the video conferencing application 360 executes a trained ML model to identify which portions of the video stream include pixels corresponding to the user. These pixels may then be further analyzed to determine one or more dominant colors (e.g., colors that occupy a significant percent of the pixels within the user pixels, such as 10% or more), which may correspond to skin tone, hair color, clothing, etc., even if an explicit association with a particular portion of the user, e.g., a particular color corresponds to the user's hair, is not determined. In some examples, the ML model, or one or more other ML models, may determine individual aspects of the user, such as pixels corresponding to the user's hair, skin, eyes, clothing, etc. Pixel values for these regions may then be separately analyzed to identify corresponding colors.

Other characteristics, such as those maintained in a user profile or user account, may be determined by accessing the user's profile or account, which may be readily available to the video conferencing application 360, if the user has logged into their account. If they have not, they may be prompted to do so, after which the video conferencing application 360 can obtain any user characteristics available within the user's profile or account.

At block 540, the video conferencing application 360 determines one or more characteristics of the video conference. As discussed above with respect to FIGS. 3A-3B, the video conferencing application may determine characteristics such as whether the meeting is a business meeting or a casual meeting, e.g., a meeting between friends or family. It may do so based on information about the schedule meeting in the user's calendar, e.g., based on the user's email account or other participants invited to the meeting, the day or time the meeting was scheduled, the subject line of the meeting, a meeting agenda included with the meeting invitation, etc.

In some examples, the video conferencing application 360 may determine a role of the user in the video conference. For example, it may determine that the user is the host of the meeting or a presenter in the meeting. It may make such a determination based on information obtained from the video conference provider 310 about the video conference, or it may obtain information from the user's calendar, e.g., that the user was the meeting organizer or that an agenda indicates that the user will be presenting or on a panel during the video conference.

At block 550, the video conferencing application 360 determines one or more characteristics of one or more virtual backgrounds. As discussed above with respect to FIGS. 3A-3B, the video conferencing application may have preprocessed a folder (or folders) including one or more virtual backgrounds. Thus, the video conferencing application may access the previously determined characteristics, such as by accessing metadata associated with the virtual backgrounds, or it may access metadata corresponding to virtual backgrounds provided by the video conference provider 310 or a content provider 350. Alternatively, the video conferencing provider may provide one or more characteristics of the user or the video conference to the video conference provider 310 or the content provider 350, and may receive in response, one or more virtual backgrounds (or identifications of one or more virtual backgrounds) that correspond to the provided characteristics. The video conferencing application may then determine one or more characteristics of the received (or identified) virtual backgrounds. In one configuration, only virtual backgrounds that are compatible (e.g., based on file size, image dimensions, image format (jpg, gif, etc.)) with the video conference application 360 may be included. However, virtual backgrounds that are not compatible may also be included (for example, the video conferencing application 360 may be configured to modify non-compatible virtual backgrounds so that they become compatible with the video conferencing application 360).

Characteristics of virtual backgrounds may include one or more dominant or pervasive colors within a virtual background, a description or identification of a scene depicted in the virtual background, an indication of whether the virtual background includes a corporate or casual scene, an indication of a time of day or season depicted in the virtual background, a brightness or intensity of the virtual background (e.g., an average brightness or intensity), etc. In addition, some virtual backgrounds may be animated or include looped video clips. Further, a characteristic of the virtual background may include a unique identifier of the virtual background, e.g., an identifier assigned by the video conference provider 31 or the content provider 350.

Characteristics of such virtual backgrounds may include determining that the virtual background has animation or video aspects, and the level of animation or activity depicted within the virtual background. For example, a virtual background depicting a beach scene may have small portions of the background being animated, such as leaves on a palm tree moving in a breeze or small waves breaking in the background. Based on changes over time to the virtual background, the video conferencing application 360 may determine that the number of pixels changing over time is a relatively small percentage of the total number of pixels in the virtual background, e.g., less than 10-25% of the pixels, and thus there is a small degree of animation. However, if a significant portion, e.g., greater than about 50%, of all of the pixels in the virtual background change over successive frames, e.g., the video depicts a first-person view from a camera, it may determine that the animation has a high degree of motion.

In addition to analyzing virtual backgrounds that may be employed by the user, the video conferencing application 360 may analyze virtual backgrounds employed by other participants in the video conference. For example, the video conferencing application 360 may query one or more other client devices and request an identification of a virtual background being used by a respective user of the client device. In some examples, the video conferencing application 360 may execute image recognition software to recognize virtual backgrounds appearing in other participants video feeds.

At block 560, the video conferencing application 360 selects a virtual background based on a characteristic of the virtual background and at least one of a characteristic of the video conference or a characteristic of the user. As discussed above with respect to FIGS. 3A-3B, a virtual background may be selected based on a correspondence between a characteristic of the virtual background and a characteristic of either (or both) of the user or the video conference. For example, a virtual background may be selected based on a color correspondence between the virtual background and the user's hair, skin, eyes, clothing, etc., or, in some examples, it may be based on lighting within the user's environment, e.g., the level of brightness in the user's environment, which may affect the user's appearance in the video stream. In some examples, the virtual background may be selected based on a correspondence between a time of day of the meeting, a day of the week, a time of year or season at the time of the meeting, etc. As discussed above, a virtual background may be selected based on the meeting being determined to be a business meeting or a casual meeting. Further, to avoid the same virtual background being used too often, the video conferencing application 360 may track when each virtual background is used and prevent one from being re-used until a minimum amount of time has passed or until a minimum number of meetings have been attended by the user, e.g., a week, five meetings. Thus, the video conferencing application may determine an elapsed time or number of elapsed meetings since the last time a virtual background was selected and, if the elapsed time or number of elapsed meetings does not satisfy a threshold, the video conferencing application may not select a specific virtual background.

In some examples, the video conferencing application 360 may also select a virtual background based on a virtual background appearing in one or more other participant's video feeds. For example, the video conferencing application 360 may not select a particular virtual background if it is already being used by another participant in the video conference. Or the video conferencing application may select a virtual background with similar characteristics to one or more other virtual backgrounds used by participants in the video conference. Such a technique may enable the various participants to feel as though they are in the same place, but without using identical backgrounds.

At block 570, the video conferencing application 360 generates a video feed comprising the received video stream and the virtual background, where the user is superimposed over the selected virtual background. As discussed above, the video conferencing application 360 may identify pixels associated with the user, such as by using a trained ML model. It may then generate a video frame using the virtual background and by replacing some of the pixels in the virtual background with the identified pixels associated with the user.

At block 580, the video conferencing application provides the video feed to the video conference provider 310, generally as described above with respect to FIGS. 1-2.

The example method 500 was described as having specific functionality occurring in a particular order; however, no such order is required. For example, while block 510 appears as the first block of functionality, the user may not join the video conference until after the virtual background has been selected at block 560, or even until after the video feed has been generated and provided to the video conference provider at blocks 570 and 580, respectively.

Similarly, blocks 520-550 may occur in any order. And while some characteristics of the user may be determined at block 530 based on a received video stream from the camera, others may be determined before any video images are received from the camera. Further, the order in which characteristics of the user, the video conference, or the virtual backgrounds are determined is arbitrary and any ordering may be used.

Further all of the functionality described above is not required according to some examples. For example, either of blocks 530 or 540 may be omitted in some examples, so long as at least one is performed. As described with respect to block 560, a virtual background may be selected based on a virtual background characteristic and at least one of a video conference characteristic or a user characteristic. Thus, the video conferencing application may not determine (or may not be configured to determine) a video conference characteristic or a user characteristic, so long as it determines a characteristic of one or the other.

Figure 6:
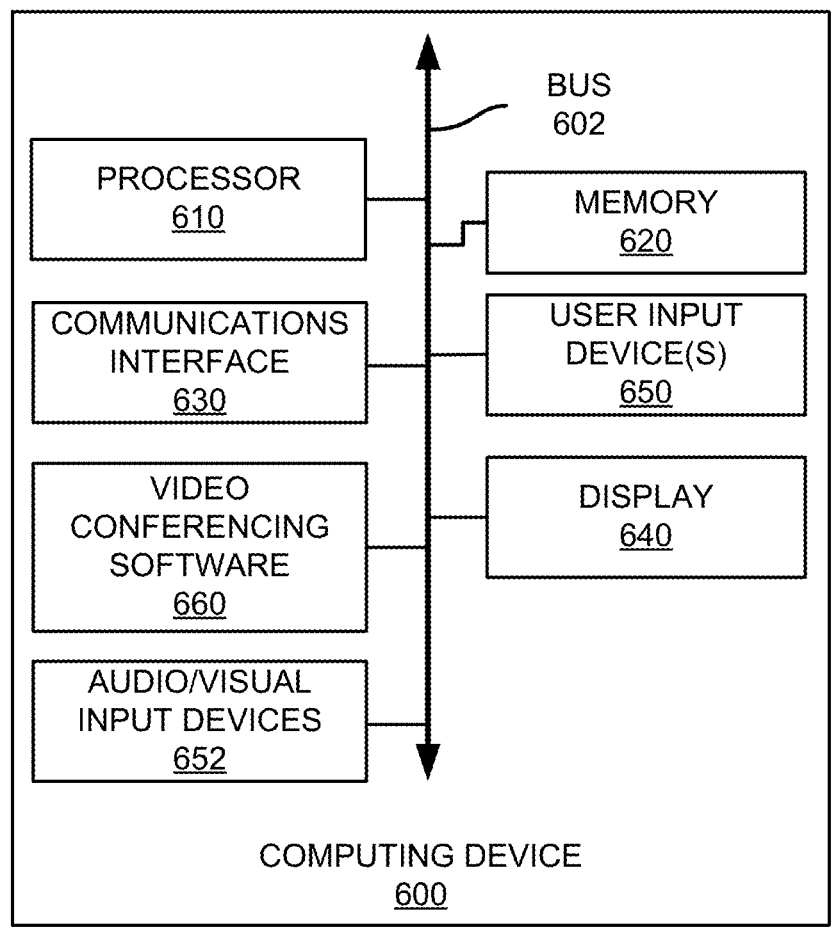
FIG. 6 shows an example computing device suitable for use with example systems and methods for dynamic context-sensitive virtual backgrounds for video conferences.

Referring now to FIG. 6, FIG. 6 shows an example computing device 600 suitable for use in example systems or methods for dynamic context-sensitive virtual backgrounds for video conferences according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for dynamic context-sensitive virtual backgrounds for video conferences according to different examples, such as part or all of the example method 500 described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes a video conferencing application 660 to enable a user to join and participate in a video conference, such as a conventional meeting or webinar, by receiving multimedia streams from a video conference provider, sending multimedia streams to the video conference provider, joining and leaving breakout rooms, selecting virtual backgrounds, etc. such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

The various examples described herein include systems, methods, and computer-readable media for dynamic context-sensitive virtual backgrounds for video conferences. In a first aspect, a method may include joining, by a client device, a video conference hosted by a video conference provider; selecting, by the client device, a virtual background from a plurality of virtual backgrounds based on a characteristic of the virtual background and at least one of a characteristic of the video conference or a characteristic of a user of the client device; receiving, by the client device from a camera, a video stream, the video stream including video images of the user; generating a video feed comprising the video images of the user superimposed over the selected virtual background; and providing the video feed to the video conference provider.

A second aspect may include the first aspect and also incorporate functionality wherein selecting the virtual background include determining a first color characteristic of the virtual background; determining a second color characteristic of the user; and wherein selecting the virtual background is based on the first and second color characteristics.

A third aspect may include the first aspect or second aspect and also incorporate functionality wherein selecting the virtual background comprises determining a type of the video conference; and wherein selecting the virtual background is based on the type of the video conference.

A fourth aspect may include any of the first through third aspects, and also include functionality wherein the virtual background is a first virtual background, and further comprising receiving a second video feed from the video conference provider, the second video feed corresponding to a participant in the video conference; determining a second virtual background from the second video feed; and wherein the first virtual background is selected to be different from the second virtual background.

A fifth aspect may include any of the first through fourth aspects and also include functionality wherein selecting the virtual background comprises determining a first brightness of the virtual background; determining a second brightness of the video; and wherein selecting the virtual background is based on the first and second brightness.

A sixth aspect may include any of the first through fifth aspects, and also include functionality wherein selecting the virtual background comprises determining a first time of day corresponding to the virtual background; determining a second time of day corresponding to the video conference; and wherein selecting the virtual background is based on the first and second times of day.

A seventh aspect may include any of the first through sixth aspects, and also include determining a role of the user in the video conference; determining one or more participants in the video conference having the role; determining a first virtual background corresponding to at least one of the one or more participants; and wherein determining the virtual background is further based on the first virtual background An eighth aspect may include any of the first through seventh aspects, and also include functionality wherein selecting the virtual background comprises determining a prior selected virtual background and an elapsed time or an elapsed number of meetings; and wherein the first virtual background is selected to be different from the prior selected virtual background based on the elapsed time or the elapsed number of meetings.

A ninth aspect may include any of the first through eighth aspects, and also include functionality wherein the characteristic of the virtual background comprises a level of animation within the virtual background.

In a tenth aspect, a non-transitory computer-readable medium includes processor-executable instructions configured to cause one or more processors to join a video conference hosted by a video conference provider; select a virtual background from a plurality of virtual backgrounds based on a characteristic of the virtual background and at least one of a characteristic of the video conference or a characteristic of a user of the client device; receive, from a camera, a video stream, the video stream including video images of the user; generate a video feed comprising the video images of the user superimposed over the selected virtual background; and provide the video feed to the video conference provider.

An eleventh aspect includes the tenth aspect, and further includes processor-executable instructions configured to cause the one or more processors to determine a prior selected virtual background and an elapsed time or an elapsed number of meetings; and wherein the first virtual background is selected to be different from the prior selected virtual background based on the elapsed time or the elapsed number of meetings.

A twelfth aspect includes any of the tenth or eleventh aspects, and further includes processor-executable instructions configured to cause the one or more processors to determine a role of the user in the video conference; determine one or more participants in the video conference having the role; determine a first virtual background corresponding to at least one of the one or more participants; and determine the virtual background further based on the first virtual background.

A thirteenth aspect includes any of the tenth through twelfth aspects, and also includes processor-executable instructions configured to cause the one or more processors to determine a first color characteristic of the virtual background; determine a second color characteristic of the user; and select the virtual background based on the first and second color characteristics.

A fourteenth aspect includes any of the tenth through thirteenth aspects, and also includes processor-executable instructions configured to cause the one or more processors to determine a type of the video conference; and select the virtual background based on the type of the video conference.

A fifteenth aspect includes any of the tenth through fourteenth aspects, and also includes processor-executable instructions configured to cause the one or more processors to receive a second video feed from the video conference provider, the second video feed corresponding to a participant in the video conference; determine a second virtual background from the second video feed; and wherein the first virtual background is selected to be different from the second virtual background.

A sixteenth aspect includes any of the tenth through fifteenth aspects, and also includes functionality wherein the virtual background is a first virtual background, and also includes processor-executable instructions configured to cause the one or more processors to receive a second video feed from the video conference provider, the second video feed corresponding to a participant in the video conference; determine a second virtual background from the second video feed; and wherein the first virtual background is selected to be different from the second virtual background.

A seventeenth aspect includes any of the tenth through sixteenth aspects, and also includes processor-executable instructions configured to cause the one or more processors to determine a first brightness of the virtual background; determine a second brightness of the video; and select the virtual background is based on the first and second brightness.

An eighteenth aspect includes any of the tenth through seventeenth aspects, and also includes functionality wherein the characteristic of the virtual background comprises a level of animation within the virtual background.

In a nineteenth aspect, a device includes a communications interface; a non-transitory computer-readable medium; and one or more processors configured to execute processor-executable instructions stored in the non-transitory computer-readable medium to join a video conference hosted by a video conference provider; select a virtual background from a plurality of virtual backgrounds based on a characteristic of the virtual background and at least one of a characteristic of the video conference or a characteristic of a user of the client device; receive, from a camera, a video stream, the video stream including video images of the user; generate a video feed comprising the video images of the user superimposed over the selected virtual background; and provide the video feed to the video conference provider.

A twentieth aspect includes the nineteenth aspect and also includes functionality wherein the one or more processors are configured to execute further processor-executable instructions stored in the non-transitory computer-readable medium to determine a prior selected virtual background and an elapsed time or an elapsed number of meetings; and wherein the first virtual background is selected to be different from the prior selected virtual background based on the elapsed time or the elapsed number of meetings.

A twenty-first aspect includes any of the nineteenth or twentieth aspect or the nineteenth aspect, and also includes functionality wherein the one or more processors are configured to execute further processor-executable instructions stored in the non-transitory computer-readable medium to determine a role of the user in the video conference; determine one or more participants in the video conference having the role; determine a first virtual background corresponding to at least one of the one or more participants; and determine the virtual background further based on the first virtual background.

A twenty-second aspect includes any of the nineteenth through twenty-first aspects, and also includes functionality wherein the one or more processors are configured to execute further processor-executable instructions stored in the non-transitory computer-readable medium to determine a first color characteristic of the virtual background; determine a second color characteristic of the user; and select the virtual background based on the first and second color characteristics.

A twenty-third aspect includes any of the nineteenth through twenty-second aspects, and also includes functionality wherein the one or more processors are configured to execute further processor-executable instructions stored in the non-transitory computer-readable medium to determine a type of the video conference; and select the virtual background based on the type of the video conference.

A twenty-fourth aspect includes any of the nineteenth through twenty-third aspects, and also includes functionality wherein the virtual background is a first virtual background, and wherein the one or more processors are configured to execute further processor-executable instructions stored in the non-transitory computer-readable medium to receive a second video feed from the video conference provider, the second video feed corresponding to a participant in the video conference; determine a second virtual background from the second video feed; and wherein the first virtual background is selected to be different from the second virtual background.

A twenty-fifth aspect includes any of the nineteenth through twenty-fourth aspects, and also includes functionality wherein the characteristic of the virtual background comprises a level of animation within the virtual background.

A twenty-sixth aspect includes any of the nineteenth through twenty-fifth aspects, and also includes functionality wherein the one or more processors are configured to execute further processor-executable instructions stored in the non-transitory computer-readable medium to determine a first brightness of the virtual background; determine a second brightness of the video; and select the virtual background based on the first and second brightness.

A twenty-seventh aspect may include any of the nineteenth through twenty-sixth aspects, and also include functionality wherein the one or more processors are configured to execute further processor-executable instructions stored in the non-transitory computer-readable medium to determine a first time of day corresponding to the virtual background; determine a second time of day corresponding to the video conference; and select the virtual background based on the first and second times of day.

A twenty-eighth aspect may include any of the nineteenth through twenty-seventh aspects, and also include functionality wherein the one or more processors are configured to execute further processor-executable instructions stored in the non-transitory computer-readable medium to determine a prior selected virtual background and an elapsed time or an elapsed number of meetings; and wherein the first virtual background is selected to be different from the prior selected virtual background based on the elapsed time or the elapsed number of meetings.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   joining, by a client device, a video conference hosted by a video conference provider;
   selecting, by the client device, a virtual background from a plurality of virtual backgrounds based on a characteristic of the virtual background and a virtual background associated with a second participant in the video conference;
   receiving, by the client device from a camera, a video stream, the video stream including video images of a user of the client device;
   generating a video feed comprising the video images of the user superimposed over the selected virtual background; and
   providing the video feed to the video conference provider.

2. The method of claim 1, wherein selecting the virtual background comprises:
   determining a first color characteristic of the virtual background;
   determining a second color characteristic of the user; and
   wherein selecting the virtual background is based on the first and second color characteristics.

3. The method of claim 1, wherein selecting the virtual background comprises:
   determining a type of the video conference; and
   wherein selecting the virtual background is based on the type of the video conference.

4. The method of claim 1, wherein the virtual background is a first virtual background, and further comprising:
   receiving a second video feed from the video conference provider, the second video feed corresponding to the second participant in the video conference;

determining a second virtual background from the second video feed; and
wherein the first virtual background is selected to be different from the second virtual background.

5. The method of claim 1, wherein selecting the virtual background comprises
determining a first brightness of the virtual background;
determining a second brightness of the video images; and
wherein selecting the virtual background is based on the first and second brightness.

6. The method of claim 1, wherein selecting the virtual background comprises
determining a first time of day corresponding to the virtual background;
determining a second time of day corresponding to the video conference; and
wherein selecting the virtual background is based on the first and second times of day.

7. The method of claim 1, further comprising:
determining a role of the user in the video conference;
determining one or more participants in the video conference having the role;
determining a first virtual background corresponding to at least one of the one or more participants; and
wherein determining the virtual background is further based on the first virtual background.

8. A non-transitory computer-readable medium comprising processor-executable instructions configured to cause one or more processors to:
join a video conference hosted by a video conference provider;
select a virtual background from a plurality of virtual backgrounds based on a characteristic of the virtual background and a virtual background associated with a second participant in the video conference;
receive, from a camera communicatively coupled to a client device comprising the one or more processors, a video stream, the video stream including video images of a user of the client device;
generate a video feed comprising the video images of the user superimposed over the selected virtual background; and
provide the video feed to the video conference provider.

9. The non-transitory computer-readable medium of claim 8, further comprising processor-executable instructions configured to cause the one or more processors to:
determine a prior selected virtual background and an elapsed time or an elapsed number of meetings; and
wherein the virtual background is selected to be different from the prior selected virtual background based on the elapsed time or the elapsed number of meetings.

10. The non-transitory computer-readable medium of claim 8, further comprising processor-executable instructions configured to cause the one or more processors to:
determine a role of the user in the video conference;
determine one or more participants in the video conference having the role;
determine a first virtual background corresponding to at least one of the one or more participants; and
determine the virtual background further based on the first virtual background.

11. The non-transitory computer-readable medium of claim 8, further comprising processor-executable instructions configured to cause the one or more processors to:
determine a first color characteristic of the virtual background;
determine a second color characteristic of the user; and
select the virtual background based on the first and second color characteristics.

12. The non-transitory computer-readable medium of claim 8, further comprising processor-executable instructions configured to cause the one or more processors to:
determine a type of the video conference; and
select the virtual background based on the type of the video conference.

13. The non-transitory computer-readable medium of claim 8, wherein the virtual background is a first virtual background, and further comprising processor-executable instructions configured to cause the one or more processors to:
receive a second video feed from the video conference provider, the second video feed corresponding to the second participant in the video conference;
determine a second virtual background from the second video feed; and
wherein the first virtual background is selected to be different from the second virtual background.

14. A device comprising:
a communications interface;
a non-transitory computer-readable medium; and
one or more processors configured to execute processor-executable instructions stored in the non-transitory computer-readable medium to:
join a video conference hosted by a video conference provider;
select a virtual background from a plurality of virtual backgrounds based on a characteristic of the virtual background and a virtual background associated with a second participant in the video conference;
receive, from a camera communicatively coupled to the device, a video stream, the video stream including video images of a user of the device;
generate a video feed comprising the video images of the user superimposed over the selected virtual background; and
provide the video feed to the video conference provider.

15. The device of claim 14, wherein the one or more processors are configured to execute further processor-executable instructions stored in the non-transitory computer-readable medium to:
determine a prior selected virtual background and an elapsed time or an elapsed number of meetings; and
wherein the virtual background is selected to be different from the prior selected virtual background based on the elapsed time or the elapsed number of meetings.

16. The device of claim 14, wherein the one or more processors are configured to execute further processor-executable instructions stored in the non-transitory computer-readable medium to:
determine a role of the user in the video conference;
determine one or more participants in the video conference having the role;
determine a first virtual background corresponding to at least one of the one or more participants; and
determine the virtual background further based on the first virtual background.

17. The device of claim 14, wherein the one or more processors are configured to execute further processor-executable instructions stored in the non-transitory computer-readable medium to:
determine a first color characteristic of the virtual background;
determine a second color characteristic of the user; and select the virtual background based on the first and second color characteristics.

18. The device of claim 14, wherein the one or more processors are configured to execute further processor-executable instructions stored in the non-transitory computer-readable medium to:
   determine a type of the video conference; and
   select the virtual background based on the type of the video conference.

19. The device of claim 14, wherein the virtual background is a first virtual background, and wherein the one or more processors are configured to execute further processor-executable instructions stored in the non-transitory computer-readable medium to:
   receive a second video feed from the video conference provider, the second video feed corresponding to the second participant in the video conference;
   determine a second virtual background from the second video feed; and
   wherein the first virtual background is selected to be different from the second virtual background.

20. The device of claim 14, wherein the characteristic of the virtual background comprises a level of animation within the virtual background.

* * * * *